United States Patent
Schaefer

(10) Patent No.: US 8,827,565 B2
(45) Date of Patent: Sep. 9, 2014

(54) ROLLER BEARING CAGE WITH PREDETERMINED RUPTURE POINT

(75) Inventor: Marc-Andre Schaefer, Uechtelhausen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/985,095

(22) PCT Filed: Nov. 15, 2011

(86) PCT No.: PCT/EP2011/070148
§ 371 (c)(1),
(2), (4) Date: Aug. 13, 2013

(87) PCT Pub. No.: WO2012/110116
PCT Pub. Date: Aug. 23, 2012

(65) Prior Publication Data
US 2014/0003758 A1    Jan. 2, 2014

(30) Foreign Application Priority Data
Feb. 18, 2011   (DE) .......................... 10 2011 004 420

(51) Int. Cl.
*F16C 33/46* (2006.01)
*F16C 43/04* (2006.01)

(52) U.S. Cl.
CPC ................. *F16C 33/46* (2013.01); *F16C 43/04* (2013.01); *F16C 2326/02* (2013.01); *F16C 33/4605* (2013.01)
USPC ........................................................ 384/572

(58) Field of Classification Search
CPC .......... F16C 33/46; F16C 43/04; F16C 43/06; F16C 43/08; F16C 43/083
USPC .............. 384/523, 572; 29/898.061, 898.064, 29/898.065
See application file for complete search history.

(56) References Cited

FOREIGN PATENT DOCUMENTS

| DE | 3139932 A | * | 4/1983 |
| DE | 4220585 A1 | * | 1/1994 |
| DE | 4220973 A1 | * | 1/1994 |
| DE | 10 2005 028 756 | | 1/2007 |
| GB | 1388645 A | * | 3/1975 |
| JP | 2008 115985 | | 5/2008 |

* cited by examiner

*Primary Examiner* — Phillip A Johnson
(74) *Attorney, Agent, or Firm* — Davidson, Davidson & Kappel, LLC

(57) ABSTRACT

A roller bearing cage 16 with roller bearing pockets 18 which are arranged one next to the other in the circumferential direction and have the purpose of holding load-bearing roller bodies 10 of a roller bearing, wherein at least one end piece 14 which engages behind a roller bearing component 12 is formed on the roller bearing cage 16. The end piece 14, which is ideally embodied as a retaining claw, holds the inner ring and the roller body 10 together, but can be removed after or during the assembly by means of a predetermined rupture point 15, in order to make room for a further component, such as for example a sealing arrangement. As a result, despite the installation assistance, optimum use of the installation space is provided.

12 Claims, 2 Drawing Sheets

ROLLER BEARING CAGE WITH PREDETERMINED RUPTURE POINT

The invention relates to a roller bearing cage with roller body pockets which are arranged side by side in the circumferential direction for receiving load-bearing roller bodies of a roller bearing.

BACKGROUND

Roller bearing cages which have roller body pockets for guiding and spacing roller bodies are used in a plurality of types of roller bearings. To support the installation process, roller body cages are provided with installation aids such that it is possible to assemble the roller bearing without a large amount of expenditure.

An example would be the so-called snap-type cage which, in the case of a radial roller bearing, is introduced axially to the roller bodies which are already arranged in the runways and is snapped into the same. To this end, the snap-type cage has a rear region and a pocket region, the pocket region being provided for receiving and guiding the roller bodies and the rear region being provided for transmitting the axial force during the installation operation.

A snap-type cage of this type is proposed, for example, in DE 10 2005 028 756 A1.

In the case of other problems posed also, roller bearing cages have designs which support the installation of the roller bearing. As often the cohesion of a plurality of components (rings, cage and roller bodies) has already to be ensured during the installation, holding aids which hold the roller bearing components thereof temporarily together are definitely advantageous for the assembly.

In each case, the installation simplification or the installation aid creates a part of the roller bearing cage which is not necessary for the actual operation and additionally takes away installation space unnecessarily which would have been usable for a sealing arrangement or for a lubricant.

SUMMARY

It is an object of the present invention to provide an easily installable roller bearing cage which takes up as little installation space as possible during the operation of the roller bearing.

The present invention provides a roller bearing cage having roller body pockets which are arranged side by side in the circumferential direction for receiving load-bearing roller bodies of a roller bearing. The roller body pockets guide the roller bodies, such as for example balls or tapered rollers, in the circumferential direction and in addition ensure the spacing between the same. At least one end piece which engages behind a roller bearing component is realized on the roller bearing cage.

The engagement behind, in this case, can be both in the axial and the radial direction. The decisive factor is that said engagement behind produces an installation advantage which makes it simpler to assemble the roller bearing. For example, for the installation of a tapered roller bearing, it is conceivable for the cage to provide a retaining means on the inner ring or on the outer ring by means of the engagement behind and for the tapered rollers to be inserted in the pockets of the roller bearing cage, whilst the latter abuts against said bearing ring. Once the pockets have been filled, the next installation step follows, such as, for example, placing a further bearing ring in position.

The end piece has a connecting piece oriented toward the roller body pockets. Said connecting piece is structurally and/or materially weakened such that a rupture of the connecting piece can take place at a defined bending force. Consequently, the connecting piece functions as a predetermined rupture point which is realized on the roller bearing cage. In other words, the connecting piece is provided for the purpose of rupturing at a certain bending load in order to separate the engaging-behind end piece permanently from the roller bearing cage. Once separated, the end piece can be disposed of and the space created is able to be utilized further for the roller bearing, for example for a sealing arrangement.

In the case of an advantageous embodiment, the connecting piece is weakened structurally by means of a notch, an incision or a recess. The structural weakening ensures the location of the rupture by it only being possible initially, as a result of a lever action which is created by means of the bending load, for plastic deformation to occur at the structural weakening. This presupposes that the rest of the end piece is realized in a sturdy manner such that in the case of the necessary bending load no rupture occurs in the rest of the end piece. This is particularly advantageous when it has to be ensured that no contamination, for example foreign bodies, pass into the area of the roller bearing.

The structural weakening, in this case, can assume various forms, it being possible for it to be supported by a certain actuation direction of the end piece to the effect that it is preferred above another form. This can occur as a result of a notch or an incision being realized either in the radial direction or in the circumferential direction. A notch in the radial direction would support an actuation direction of the end piece in its circumferential direction, it being simple to rupture in the said direction as a result. The opposite applies to a design in the circumferential direction.

In an advantageous manner, the connecting piece is weakened materially by means of an addition or a mixture of a substance. In said context, the material of the roller bearing cage is deemed to be the base material which is able to be enriched with a substance at the position of the connecting piece, it simply needing to be, for example, a contaminant which weakens the material connection at said position. This is possible, for example, by introducing small air bubbles or metal particles. Both would weaken the cohesion of the connecting piece as a result of the displacing volume of their base material.

As an alternative to this, the material of the roller bearing cage, including the connecting piece can be formed from one single material, the connecting piece being formed during the injection operation by a yield point. The yield point can consequently serve as the predetermined rupture point.

In an advantageous manner, the engaging-behind end piece is realized as a retaining claw. To this end, the retaining claw lies axially or radially on the roller bearing component, such as, for example, an inner ring or a rib washer. As an alternative to this, the roller bearing component could also be a component of the sealing arrangement which seals the roller bearing. In order to obtain the desired cohesion, the retaining claw is under a certain preliminary tension which, however, must only result in a small bending load of the connecting piece which has to be clearly below the bending load necessary for a rupture.

The engaging-behind end piece can realize or have an actuating element on the end remote from the roller body pockets. The rupture of the connecting piece is consequently simplified when the action supporting the installation is no longer required. This can occur automatically or manually in one method step.

The actuation of the actuating element is also made easier when it is pursued at least in part in the circumferential direction.

In general, but in particular for manual handling, at least two permanently separable, engaging-behind end pieces can be provided. Several end pieces are sensible when the holding or positioning of the cage is able to be simplified as a result.

In an advantageous manner, the bending load necessary for permanent separation is dimensioned in such a manner that a rupture of the connecting piece can be carried out by hand. This can be achieved by means of corresponding selection of the base material or by means of a certain structural or material weakening of the connecting piece or a combination of the two. In an advantageous manner, in dependence on the desired actuating direction, the rupturing of the connecting piece can be supported in the circumferential direction or radial direction by the structurally and/or materially weakened connecting piece being weakened in the circumferential direction or in a radial manner. For example, a notch can be aligned in the connecting piece in the circumferential direction or in the radial direction.

A cage as claimed in the invention can be used in particular in radial bearings, such as, for example, in wheel bearings.

BRIEF DESCRIPTION OF THE DRAWINGS

Further advantageous designs and preferred further developments of the invention can be found in the description of the figures and/or the sub-claims.

The invention is described and explained below by way of the exemplary embodiments shown in the figures, in which, in detail.

DETAILED DESCRIPTION

Figure 1:
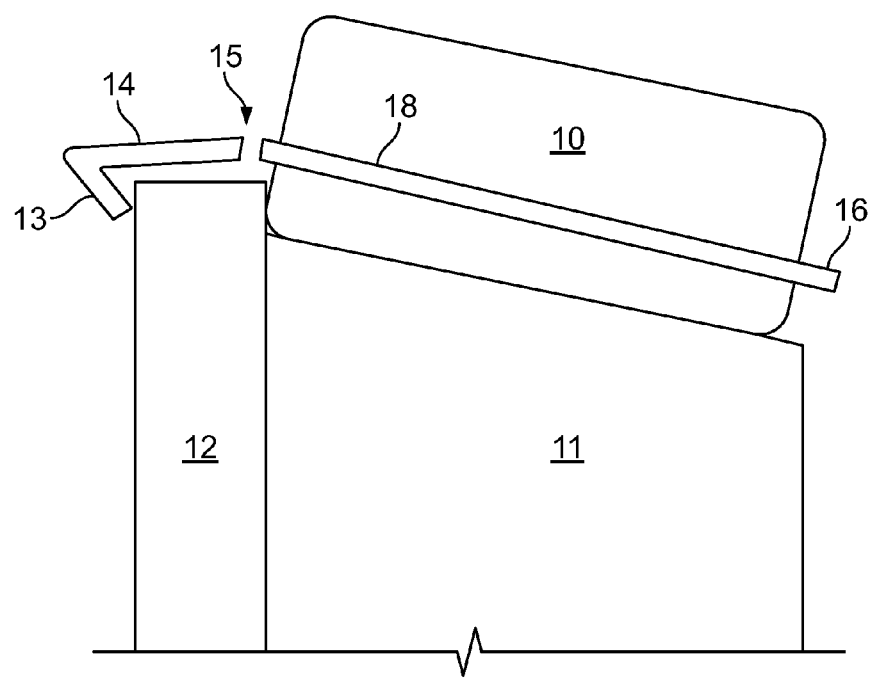
FIG. 1 shows a partially illustrated, single-row tapered roller bearing with a bearing cage with a predetermined rupture point oriented in the circumferential direction.

FIG. 1 shows a partially illustrated, single-row tapered roller bearing with a bearing cage with a predetermined rupture point which is formed out of a materially weakened connecting piece 15.

The rib washer 12 abuts against the inner ring 11 and together with the roller bodies and further parts (not illustrated) forms a single-row roller bearing, such as are used, for example, for wheel bearings for heavy goods vehicles.

The continuation 13 is the radially inwardly extending part of the end piece 14 (which is embodied as a retaining claw) which makes the cohesion of the cage 16, the roller body 10, the inner ring 11 and the rib washer 12 possible. The rib washer 12 can also be realized integrally with the inner ring 11.

The assembly is consequently conceivably simple. The cage 16 is placed radially around the rib washer 12 and the inner ring 11, it holding said parts together axially even without roller bodies 10. The roller bodies 10 can then be inserted from the outside. Finally, only the outer ring (not illustrated) still has to be placed in position in order to complete the single-row roller bearing.

To use the roller bearing, it is now possible to press on a sealing arrangement, for example a cassette seal, on the rib washer 12. To this end, the end piece 14 can now be actuated and, by rupturing the predetermined rupture point 15, can be separated from the roller bearing cage, sufficient radial installation space to fasten the seal being gained as a result.

Figure 2:
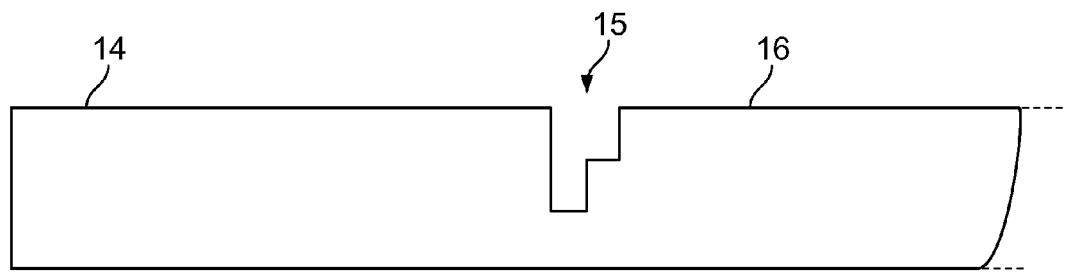
FIG. 2 shows the roller bearing cage from FIG. 1 from a radial viewing direction.

FIG. 2 shows the roller bearing cage from FIG. 1 from a radial viewing direction with the predetermined rupture point 15. The predetermined rupture point 15 is a notch 15 which is aligned in the radial direction with reference to the rotational axis of the roller bearing cage. Consequently, actuation for a rupture on the end remote from the roller body cage along the circumferential direction is preferred.

Figure 3:
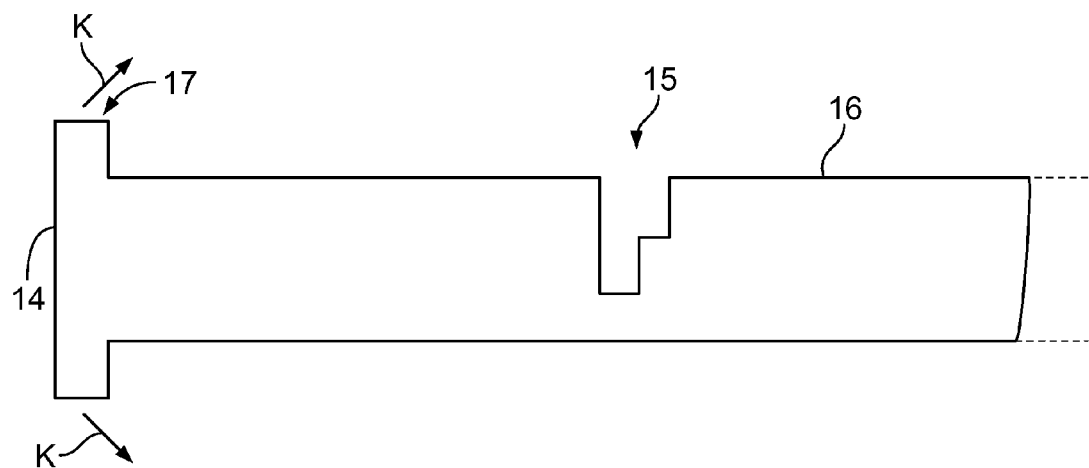
FIG. 3 shows the roller bearing cage from FIG. 1 with an actuating element from a radial viewing direction and FIG. 4 shows a partially illustrated, single-row tapered roller bearing with a bearing cage with a radial predetermined rupture point.

FIG. 3 shows the roller bearing cage from FIG. 1 with an actuating element 17 from the radial viewing direction. Compared to FIG. 2, the end piece continues on both sides in the circumferential direction, as a result actuation, in particular manual actuation, is supported.

The possible actuating force directions for a rupture are indicated by means of the arrows K proceeding from the continuation.

Figure 4:
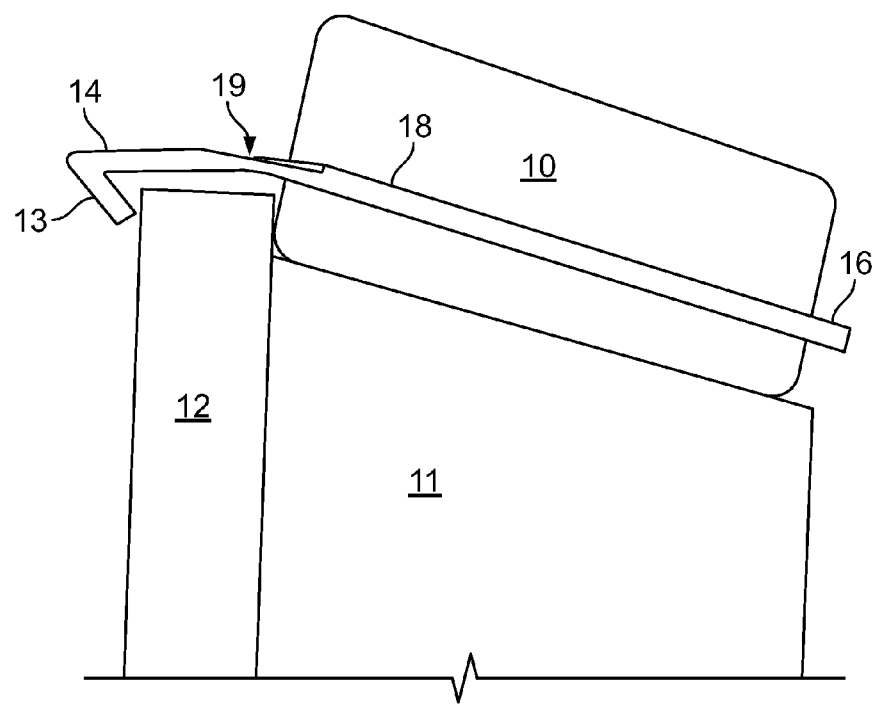

FIG. 4 shows a partially illustrated, single-row tapered roller bearing with a bearing cage with a radial predetermined rupture point. The tapered roller bearing and the roller bearing cage, in this case, correspond to the tapered roller bearing from FIG. 1, the predetermined breaking point simply not being oriented in the circumferential direction, but being radially oriented, as a result of which the bending direction when rupturing the end piece 14 is directed rather in a radial manner. This can be selected from bearing to bearing such that in each case sufficient space is present for manual handling or automatic rupturing. In the case of radial bearings, in the majority of cases a predetermined rupture point 15 oriented in the circumferential direction, as in FIG. 1, is more advantageous because, as a rule, more space is present in the circumferential direction than in the radial direction. Should during the production process, once a bearing ring, for example, the inner ring 11, has been placed in position, the counterpart, for example the outer ring, be tightened, it is possible for the end piece 14 to have already been broken off first of all, as a result of which more radial space would be available and consequently a radial predetermined rupture point 19 would be more advantageous.

In summary, the invention relates to a roller bearing cage 16 with roller body pockets 18 which are arranged side by side in the circumferential direction for receiving load-bearing roller bodies 10 of a roller bearing, wherein at least one end piece 14 which engages behind a roller bearing part 12 is realized on the roller bearing cage 16. The end piece 14, which is realized ideally as a retaining claw, holds the inner ring and the roller bodies 10 together, but can be removed after or during the assembly via the predetermined rupture point 15 in order to make space for a further component, such as, for example, a sealing arrangement. Consequently, in spite of the installation support, optimum use of the installation space is provided.

LIST OF REFERENCES

K Actuating force direction
10 Roller body
11 Inner ring
12 Rib washer
13 Radial continuation
14 Engaging-behind end piece 15 Connection piece weakened in the circumferential direction (predetermined rupture point oriented in the circumferential direction)
16 Roller bearing cage
17 Actuating element
18 Roller bearing cage pocket
19 Connection piece weakened in the radial direction (radial predetermined rupture point)

What is claimed is:

1. A roller bearing cage comprising:
a cage defining roller body pockets arranged side by side in the circumferential direction for receiving load-bearing roller bodies of a roller bearing; and
at least one end piece connected to the cage and engaging behind a roller bearing component, the end piece having a structurally or materially weakened connecting piece toward the roller body pockets, the connecting piece designed to rupture at a certain bending load in order to separate end piece permanently from the cage.

2. The roller bearing cage as recited in claim 1 wherein the connecting piece is weakened structurally by a notch, an incision or a recess.

3. The roller bearing cage as recited in claim 1 wherein the connecting piece is weakened materially by an addition or a mixture of a substance.

4. The roller bearing cage as recited in claim 1 wherein the end piece includes a retaining claw.

5. The roller bearing cage as recited in claim 1 wherein the end piece includes an actuating element on an end remote from the roller body pockets.

6. The roller bearing cage as recited in claim 5 wherein the actuating element is continued at least in part in the circumferential direction.

7. The roller bearing cage as recited in claim 1 further comprising a further permanently separable, engaging-behind end piece.

8. The roller bearing cage as recited in claim 1 wherein the roller bearing component is an inner ring, an outer ring, a rib washer or a component part of a sealing arrangement of the roller bearing.

9. The roller bearing cage as recited in claim 1 wherein a bending load necessary for permanent separation is dimensioned in such a manner that a rupture of the connecting piece can be carried out manually.

10. The roller bearing cage as recited in claim 1 wherein the structurally or materially weakened connecting piece is weakened in the circumferential direction or in the radial direction.

11. A roller bearing comprising the roller bearing cage as recited in claim 1.

12. A wheel bearing comprising the roller bearing cage as recited in claim 1.

* * * * *